United States Patent
Kamiya et al.

(10) Patent No.: US 10,343,626 B2
(45) Date of Patent: *Jul. 9, 2019

(54) METHOD FOR MANUFACTURING WIRE HARNESS

(71) Applicants: DAIWA KASEI INDUSTRY CO., LTD., Aichi (JP); TOYOTA JIDOSHA KABUSHIKI KAISHA, Aichi-ken (JP)

(72) Inventors: Kouji Kamiya, Aichi (JP); Yuusuke Ito, Aichi (JP); Makoto Suzuki, Aichi (JP); Hiroaki Suzuki, Aichi (JP); Kentaro Furuki, Aichi-ken (JP); Masanari Ichihara, Aichi-ken (JP)

(73) Assignee: DAIWA KASEI INDUSTRY CO., LTD., Aichi-Ken (JP)

( * ) Notice: Subject to any disclaimer, the term of this patent is extended or adjusted under 35 U.S.C. 154(b) by 264 days.

This patent is subject to a terminal disclaimer.

(21) Appl. No.: 15/076,735

(22) Filed: Mar. 22, 2016

(65) Prior Publication Data

US 2016/0279670 A1    Sep. 29, 2016

(30) Foreign Application Priority Data

Mar. 25, 2015  (JP) ................................ 2015-063143
Feb. 26, 2016  (JP) ................................ 2016-036240

(51) Int. Cl.
*B29C 39/10*   (2006.01)
*B60R 16/02*   (2006.01)
(Continued)

(52) U.S. Cl.
CPC .......... *B60R 16/0215* (2013.01); *B29C 39/10* (2013.01); *B29C 45/00* (2013.01);
(Continued)

(58) Field of Classification Search
None
See application file for complete search history.

(56) References Cited

U.S. PATENT DOCUMENTS 2,436,984 A * 3/1948 Wilson .............. B29C 45/14467
                                                   156/48
3,671,622 A * 6/1972 Humphries .............. B05D 7/20
                                                   264/263
(Continued)

FOREIGN PATENT DOCUMENTS

DE        3903059     *  8/1990
JP     1986-161913       7/1986
(Continued)

OTHER PUBLICATIONS

Indian office action dated Apr. 2, 2019, issued in application No. IN 201634010018.

*Primary Examiner* — Edmund H Lee
(74) *Attorney, Agent, or Firm* — McClure, Qualey & Rodack, LLP

(57) ABSTRACT

An objective is to provide a hitherto not-existing retention component that is for a wiring bundle and can be manufactured without tying the wiring bundle, a wire harness including the retention component, and a manufacturing method and a manufacturing device for the wire harness.
A metal mold that is used has a penetration hole in which a wiring bundle is to be penetratingly disposed, an annular retention portion-molding space for surrounding the outer circumference of the wiring bundle, and an engagement portion-molding space communicatively connected with the retention portion-molding space. The wiring bundle is disposed in the penetration hole, a melt resin is poured in the retention portion-molding space from the engagement portion-molding space, and solidified through cooling to mold a retention portion integrally with a engagement portion in a state of being closely adhered to an outer circumference of the wiring bundle.

13 Claims, 15 Drawing Sheets

(51) Int. Cl.
*B29C 45/14* (2006.01)
*B29C 45/00* (2006.01)
*H02G 3/32* (2006.01)

(52) U.S. Cl.
CPC .. *B29C 45/14016* (2013.01); *B29C 45/14065* (2013.01); *B29C 45/14262* (2013.01); *B29C 45/14385* (2013.01); *B29C 45/14467* (2013.01); *B29C 45/14549* (2013.01); *B60R 16/0207* (2013.01); *H02G 3/32* (2013.01)

(56) References Cited

U.S. PATENT DOCUMENTS

| | | | | |
|---|---|---|---|---|
| 4,292,267 | A * | 9/1981 | Haynes | B29C 45/14565 264/157 |
| 4,495,130 | A * | 1/1985 | Hedrick | H01R 43/24 264/254 |
| 5,604,976 | A * | 2/1997 | Stobie | A61N 1/02 264/263 |
| 5,846,467 | A * | 12/1998 | Saito | B60R 16/0222 264/263 |
| 6,890,464 | B2 * | 5/2005 | Suzuki | B29C 70/74 264/134 |
| 8,226,872 | B2 * | 7/2012 | Cortes Roque | B29C 45/14311 264/261 |
| 9,908,486 | B2 * | 3/2018 | Suzuki | B60R 16/0215 |
| 2011/0177720 | A1 * | 7/2011 | Cortes Roque | B29C 45/14311 439/660 |
| 2012/0055605 | A1 | 3/2012 | Murata et al. | |
| 2016/0181776 | A1 * | 6/2016 | Tsukamoto | H02G 3/0468 174/68.3 |

FOREIGN PATENT DOCUMENTS

| | | | |
|---|---|---|---|
| JP | 61161913 | * | 7/1986 |
| JP | 53-153721 U | | 10/1988 |
| JP | 2000289047 A | | 10/2000 |
| JP | 2005026178 A | | 1/2005 |
| JP | 2005199482 A | | 7/2005 |
| JP | 2005-341776 | | 12/2005 |
| JP | 2007-130814 A | | 5/2007 |
| JP | 2010267412 A | | 11/2010 |
| JP | 2013-041676 | | 2/2013 |
| JP | 2013-041677 | | 2/2013 |
| JP | 2014222628 A | | 11/2014 |
| JP | 2015044310 A | | 3/2015 |
| WO | 2012/137679 A1 | | 10/2012 |
| WO | WO 2015/029956 | * | 3/2015 |

* cited by examiner

METHOD FOR MANUFACTURING WIRE HARNESS

RELATED APPLICATIONS

This application claims the priority of Japanese Patent Application No. 2015-063143 filed on Mar. 25, 2015 and 2016-036240 filed on Feb. 26, 2016. The disclosure of the prior application is hereby incorporated herein in the entirety by reference.

BACKGROUND OF THE INVENTION

Field of the Invention

This invention relates to a retention component for a wiring bundle, a wire harness including the retention component, and a manufacturing method and manufacturing device for the wire harness.

Description of Related Art

For example, in a vehicle, attachment objects such as a wire harness are laid in a vehicle body. In this case, a wiring bundle forming the wire harness is tied and retained by a retention component, and the retention component is attached to the vehicle body. Examples of such a retention component include a so-called belt clamp or the like for tying the wiring bundle with a belt (see Japanese Laid-Open Patent Publication No. 2005-341776).

SUMMARY OF THE INVENTION

However, with the belt clamp of Japanese Laid-Open Patent Publication No. 2005-341776, a manual labor of winding and tying the belt to the wiring bundle forming the wire harness is required. Even with other retention components that are not the belt clamp, some manual labor of tying the wiring bundle is essential.

An objective of this invention is to provide a hitherto not existing retention component that is for a wiring bundle and can be manufactured without an operation of tying the wiring bundle that is to be a wire harness, a wire harness including the retention component, and a manufacturing method and a manufacturing device for the wire harness.

In order to achieve the above described objective, the method for manufacturing the wire harness of this invention is a method for manufacturing a wire harness including an engagement portion to be attached to a vehicle body, a wiring bundle, and a retention portion configured to retain the wiring bundle, with usage of a metal mold having a penetration hole in which the wiring bundle is penetratingly disposed, an annular retention portion-molding space that surrounds, at an intermediate section of the penetration hole, an outer circumference of the disposed wiring bundle, and an engagement portion-molding space that is communicatively connected with the retention portion-molding space and that has an inflow opening for a melt resin, the method comprising: pouring the melt resin from the inflow opening in a state where the wiring bundle is penetratingly disposed in the penetration hole of the metal mold to load the melt resin from the engagement portion-molding space for forming the engagement portion to the retention portion-molding space for forming the retention portion; and solidifying the resin through cooling to mold the retention portion, formed integrally with the engagement portion, in a tied state of being closely adhered to a rugged outer circumferential surface of the wiring bundle.

With this invention, since molding of the retention portion and a tying operation of tying the wiring bundle can be conducted simultaneously, the conventional tying operation performed by hands of a worker can be omitted, and working efficiency can be improved significantly. In addition, with this invention, since loading of the resin starts from the engagement portion-molding space having a complicated shape, the resin reaches the very tip of the engagement portion-molding space with certainty. In addition, the outer circumferential surface of the wiring bundle is rugged. Thus, the resin loaded within the retention portion-molding space may leak outside from concavities on the outer circumferential surface of the wiring bundle. However, with this invention, since the inflow opening for the resin exists on the engagement portion-molding space, the engagement portion-molding space is loaded first, and then the resin reaches the retention portion-molding space. Since the resin, which has reached the retention portion-molding space, has a lower temperature, a higher viscosity, and a lower pressure; the resin is unlikely to leak outside from inter-wire gaps that form the concavities. This is convenient also from a standpoint of preventing leakages. In addition, reduction of pressure in the resin, which has reached the retention portion-molding space, means lower force that tries to push the wiring bundle, located at the center of the annular retention portion-molding space, out from the center, and is convenient also from a standpoint of being able to mold the annular retention portion with certainty.

DESCRIPTION OF THE PREFERRED EMBODIMENTS

Figure 1:
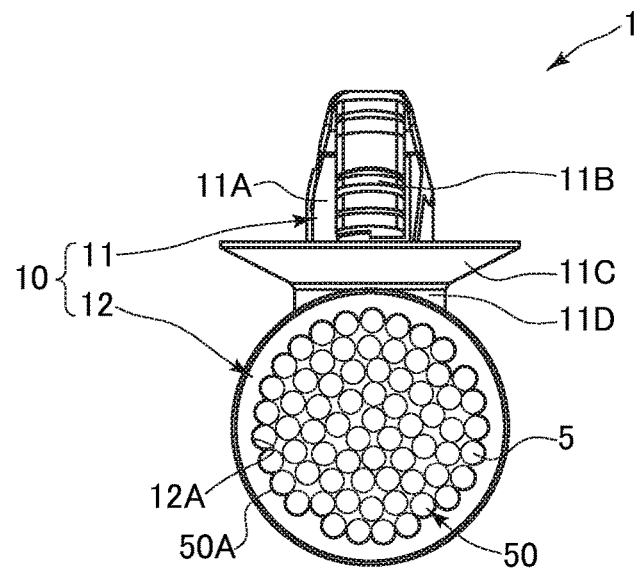
FIG. 1 shows a lateral surface of a wire harness according to a first embodiment of this invention.

In the following, embodiments of this invention will be described with reference to the examples shown in the drawings.

Figure 2:
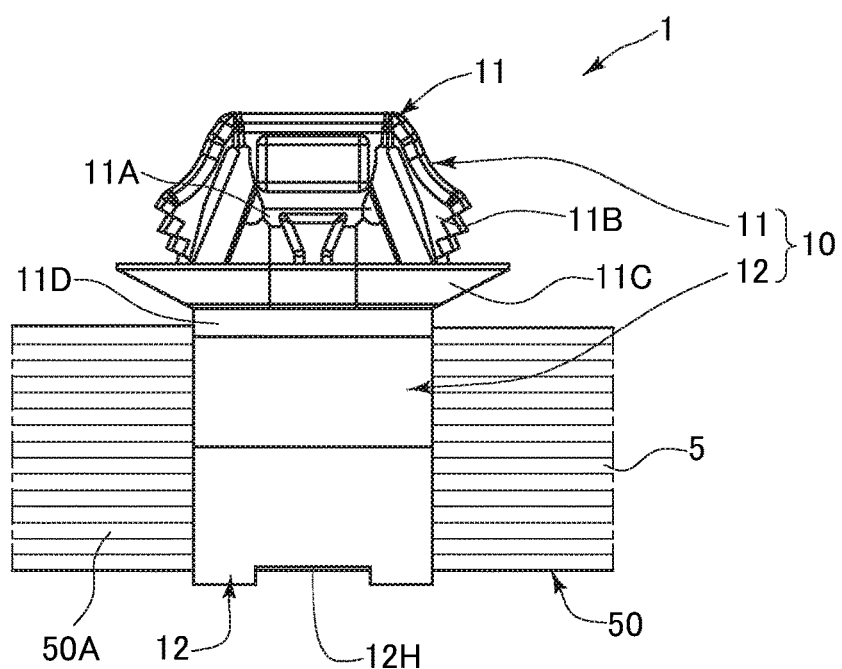
FIG. 2 is a front view corresponding to FIG. 1.

As shown in FIGS. 1 and 2, a retention component 10 of this embodiment is formed of a resin molded body that integrally includes an engagement portion 11 to be attached to a vehicle body, and a retention portion 12 configured to retain a wiring bundle 50 formed of multiple wiring members 5. A wire harness 1 has the retention component 10, and the wiring bundle 50 retained in a closely adhered state by the retention portion 12 of the retention component 10. The wiring members 5 are those that are known in the art, including an electrically conductive core wire formed of one or more lead wires, and an electrically non-conductive cover portion configured to cover the outer circumference of the core wire.

Figure 3:
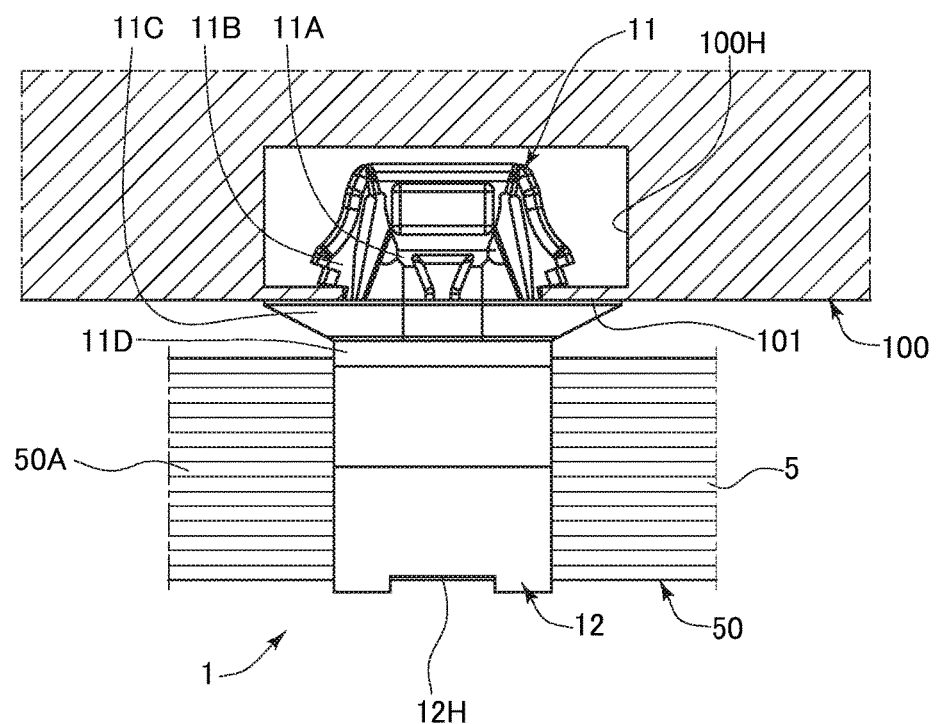
FIG. 3 shows one example of a state in which the wire harness of FIG. 1 is attached on a vehicle body side.

As shown in FIG. 3, the engagement portion 11 is a part that is to be attached to a vehicle body 100 side when the engagement portion 11 is inserted in, and is engaged within, a predetermined attachment hole 100H formed on a harness attachment portion on the vehicle body 100 side. The engagement portion 11 has a shaft portion 11A, an elastic portion 11B, a contact portion 11C, and a connecting portion 11D. The engagement portion 11 is attached to the vehicle body 100 side when the engagement portion 11 enters an engaged state in a form of sandwiching, by the elastic portion 11B inserted in the attachment hole 100H and the contact portion 11C not inserted in the attachment hole 100H, a hole surrounding portion 101 that forms the attachment hole 100H on the vehicle body 100 side. The elastic portion 11B and the contact portion 11C function as engagement attachment portions enabling engagement and attachment to the attachment hole 100H on the vehicle body 100 side.

The elastic portion 11B is provided on a front end (a leading end of an insertion direction toward the attachment hole 100H) side of the shaft portion 11A. Specifically, the elastic portion 11B has a shape extending out so as to expand outwards from the front end side (an opposite side of the retention portion 12) and toward the back end side (the side of the retention portion 12) of the shaft portion 11A, and the extension leading side of the elastic portion 11B can, by using a base end side thereof as a root, elastically deform inwards toward the shaft portion 11A side. When being attached to the vehicle body 100 side, the elastic portion 11B functions as an elastic engagement portion configured to prevent detachment from the attachment hole 100H, since the elastic portion 11B is inserted in the attachment hole 100H in an inward-contracted form resulting from the elastic deformation and expands outward after being inserted because of elastic restoration.

The contact portion 11C is provided on the back end side of the shaft portion 11A. Specifically, the contact portion 11C extends out so as to expand outwards from the back end side toward the leading end side of the shaft portion 11A, and, when being attached to the vehicle body 100 side, is not inserted in the attachment hole 100H and the leading end of the contact portion 11C contacts the surrounding surface of the attachment hole 100H. In this embodiment, a rear end part of the shaft portion 11A is the connecting portion 11D that connects to the retention portion 12.

As shown in FIGS. 1 and 2, the retention portion 12 is a part configured to retain the wiring bundle 50 in a tied state, and is formed annularly so as to surround the outer circumference of the wiring bundle 50 in a form of being closely adhered to an outer circumferential surface 50A of the wiring bundle 50. The retention portion 12 is formed as a cylinder surrounding the wiring bundle 50. An inner circumferential surface 12A of the retention portion 12 is formed to be rugged in accordance with the rugged outer circumferential surface of the wiring bundle 50. Thus, in this embodiment, the inner circumferential surface 12A of the retention portion 12 fills the gaps of the ruggedness on the outer circumferential surface 50A of the wiring bundle 50 to obtain a closely adhered state.

The retention component 10 is manufactured such that molding of the retention portion 12 and tying and retaining of the wiring bundle 50 by the retention portion 12 are conducted simultaneously. Furthermore, the retention component 10 is manufactured such that molding of the retention portion 12 and molding of the engagement portion 11 are conducted simultaneously. Thus, in this embodiment, the retention component 10 integrally including the retention portion 12 and the engagement portion 11 is molded in a state of tying and retaining the wiring bundle 50.

A method for manufacturing the retention component 10 in this embodiment will be described.

Figure 4:
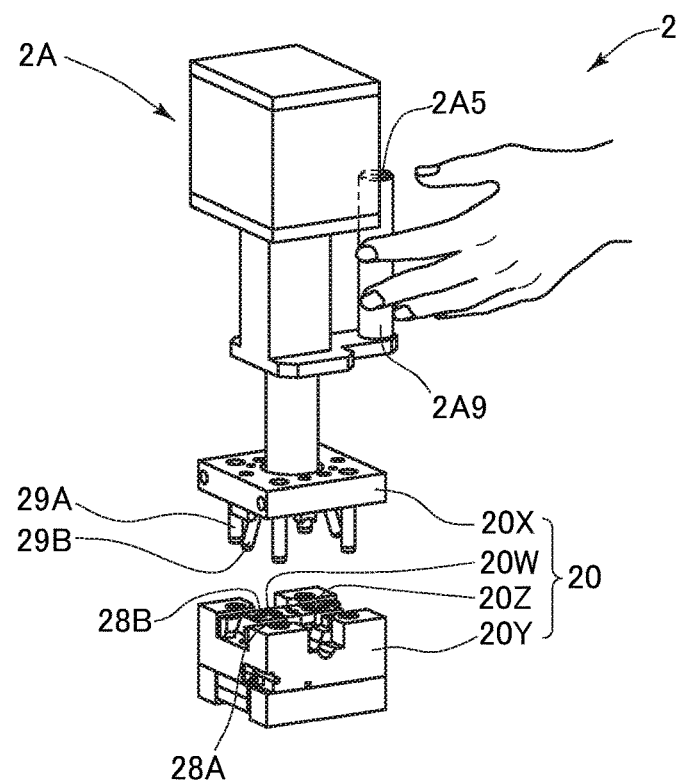
FIG. 4 shows a mold-opened state of a metal mold in a manufacturing device configured to manufacture the wire harness in FIG. 1.
Figure 5:
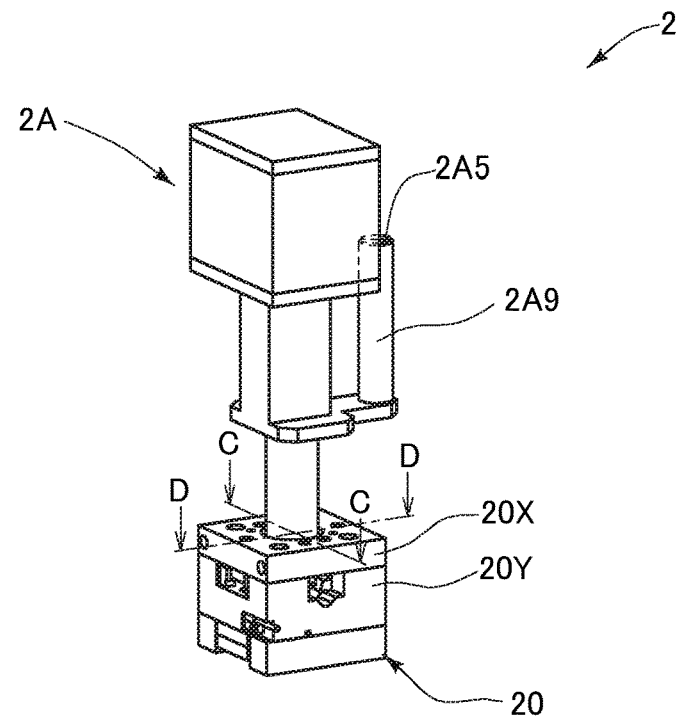
FIG. 5 shows a mold-closed state of the metal mold in the manufacturing device in FIG. 4.
Figure 6:
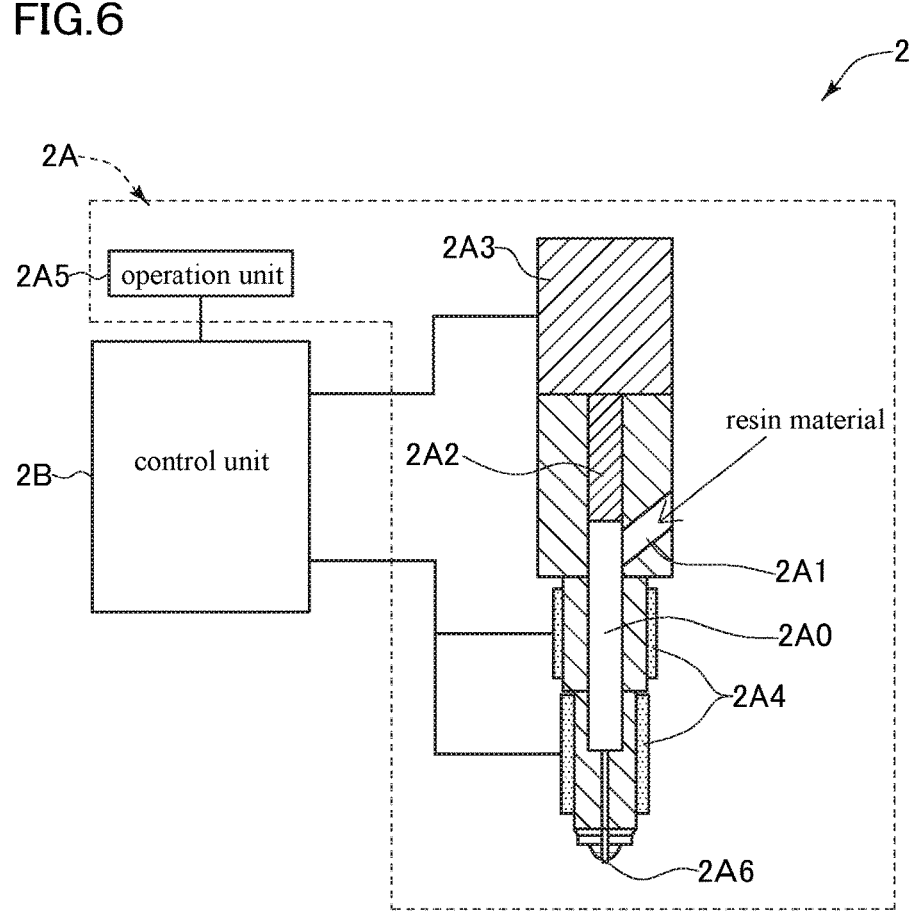
FIG. 6 is a block diagram showing, in a simple manner, the electrical configuration of the manufacturing device in FIG. 4.

First, a molding machine (manufacturing device) 2 used for manufacturing the retention component 10 will be described. As shown in FIGS. 4 to 6, the molding machine 2 includes a metal mold 20 (see FIGS. 4 and 5) that forms a molding space 200 to which a melt resin can be supplied, a resin supplying device 2A (resin supply means: see FIGS. 4 to 6) configured to supply the melt resin into the molding space 200 (see FIGS. 13 and 14), and a control unit 2B (resin supply control means: see FIG. 6) configured to control the supply of the melt resin.

The resin supplying device 2A employs a plunger method, and, as shown in FIG. 6, includes a cylinder 2A0, a material input opening 2A1 through which a resin material that becomes the melt resin is poured inside the cylinder 2A0, a plunger 2A2 for applying pressure and extruding the melt resin within the cylinder 2A0, a drive mechanism 2A3 configured to drive the plunger 2A2, a thermoplasticizing unit (melting unit) 2A4 configured to generate heat such that the resin material within the cylinder 2A0 melts, and an operation unit 2A5 configured to accept a predetermined resin supplying operation for supplying the melt resin. The drive mechanism 2A3 has a servomotor that becomes the drive source, and a mechanism for converting a rotational output thereof into a pressure application motion (extruding motion) of the plunger 2A2. A weighed resin material within the cylinder 2A0 is extruded by the plunger 2A2 in a melted state, and is ejected from a nozzle 2A6.

The control unit 2B (control means) is a microcomputer known in the art, and, when the resin supplying operation is performed on the operation unit 2A5 of the resin supplying device 2A, drives the thermoplasticizing unit 2A4 and the drive mechanism 2A3 of the resin supplying device 2A to supply the weighed resin material within the cylinder 2A0 into the molding space 200 as the melt resin.

Next, the metal mold 20 will be described. As shown in FIGS. 4 and 5, the metal mold 20 has a movable mold 20X, a fixed mold 20Y, a first slide mold 20Z, and a second slide mold 20W, and, when those are positioned and combined as guide pins 29A and 29B are inserted through guide holes 28A and 28B, the metal mold 20 is closed and forms the molding space 200 therein (see FIGS. 13 and 14). The fixed mold 20Y is disposed in a state of being positioned such that the fixed mold 20Y does not move with respect to a predetermined structure such as, for example, a table (e.g., a state of being fixed with respect to the predetermined structure). On the other hand, the movable mold 20X is integrated with the resin supplying device (resin supply means) 2A and is a handy type mold that is provided with a holding portion (also referred to as a handle portion) 2A9 that is to be held by a hand.

The resin supplying device 2A has the operation unit 2A5 for externally supplying the melt resin. As shown in FIG. 6, the operation unit 2A5 is connected to the control unit 2B, and the control unit 2B, when a predetermined resin supplying operation is performed on the operation unit 2A5 by a user, drives the resin supplying device 2A (the thermoplasticizing unit 2A4 and the drive mechanism 2A3) such that external supplying of the melt resin is executed.

The operation unit 2A5 is provided at a position enabling operation by a hand of a user holding the holding portion 2A9 of the movable mold 20X. Specifically, as shown in FIGS. 4 and 5, the operation unit 2A5 here is a push button provided at the top of the columnar holding portion 2A9. Thus, the movable mold 20X of this embodiment can be regarded as a handgun type resin supplying device having the holding portion 2A9, and the resin supplying device (resin supply means) 2A including the operation unit 2A5. With this, the resin supplying operation of the melt resin can be performed easily. However, the operation unit 2A5 can be provided at a position enabling operation by the other hand not holding the holding portion 2A9, or can be provided separately from the movable mold 20X.

Figure 11:
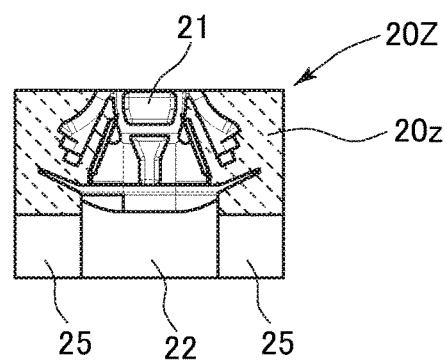
FIG. 11 shows a surface that belongs to the first slide mold disposed on the upper surface of the fixed mold in the manufacturing device in FIG. 4 and that is to be joined with the second slide mold.
Figure 12:
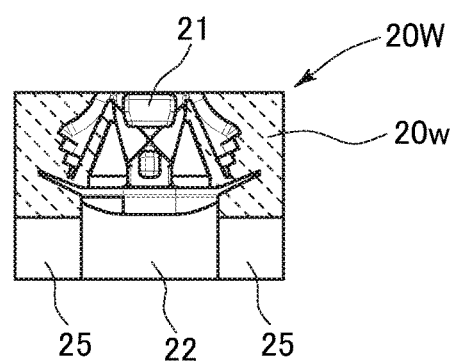
FIG. 12 shows a surface that belongs to the second slide mold disposed on the upper surface of the fixed mold in the manufacturing device in FIG. 4 and that is to be joined with the first slide mold.

The metal mold 20 has the molding space 200 (see FIGS. 13 and 14) for molding the retention component 10 in the mold-closed state. th solid lines, one cut surface obtained by cutting the metal mold 20 in FIG. 5 in direction C, the hatching area marked with dashed lines is not a cut surface but shows a joining surface 20z (see FIG. 11) of the first slide mold 20Z with respect to the second slide mold 20W. It should be noted that, since the other cut surface (i.e., a cross section of the metal mold 20 on a side where a joining surface 20w (see FIG. 12) of the second slide mold 20W with respect to the first slide mold 20z appears) on the opposite side of the cut surface in FIG. 13 is similar to that in FIG. 13 although being slightly different, diagrammatic representation of that is omitted.

Figure 7:
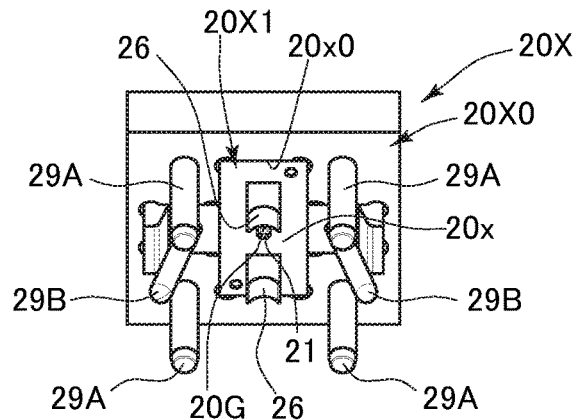
FIG. 7 is a perspective view showing a lower surface of a movable mold located on the upper side in the manufacturing device in FIG. 4.
Figure 8:
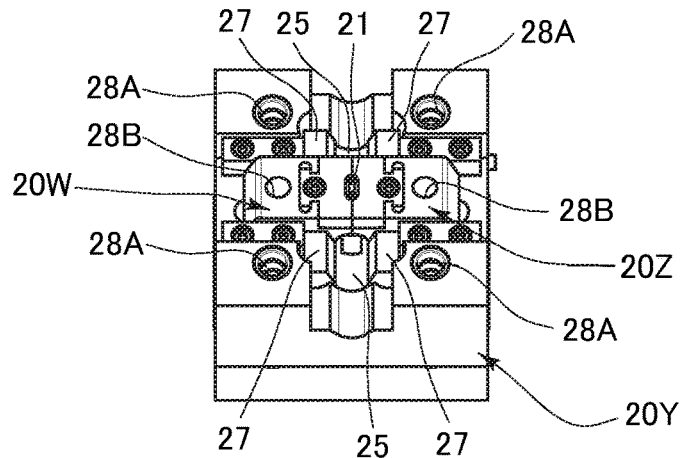
FIG. 8 is a perspective view showing an upper surface of a fixed mold located on the lower side in the manufacturing device in FIG. 4, and first and second slide molds disposed thereabove.
Figure 9:
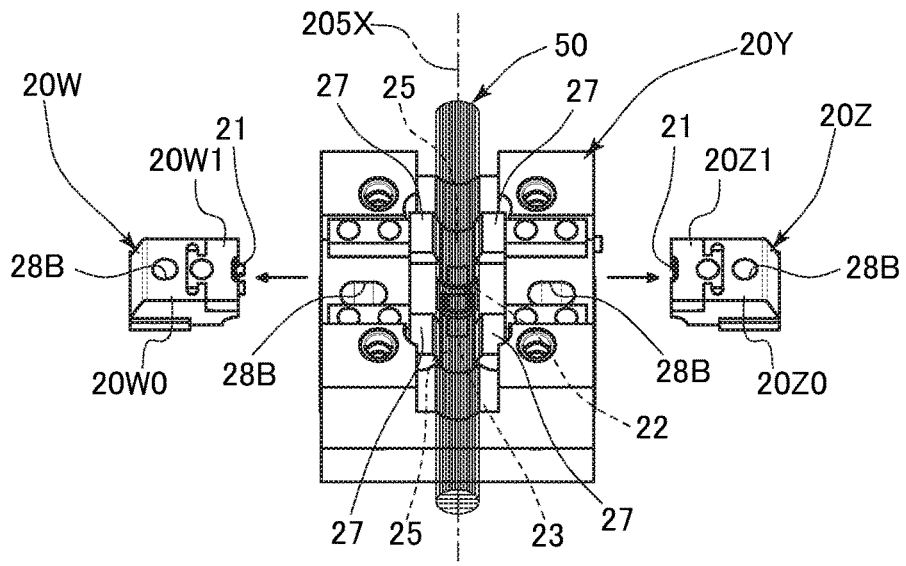
FIG. 9 is a perspective view showing a state in which the wiring bundle is disposed on the fixed mold in the manufacturing device in FIG. 4.
Figure 13:
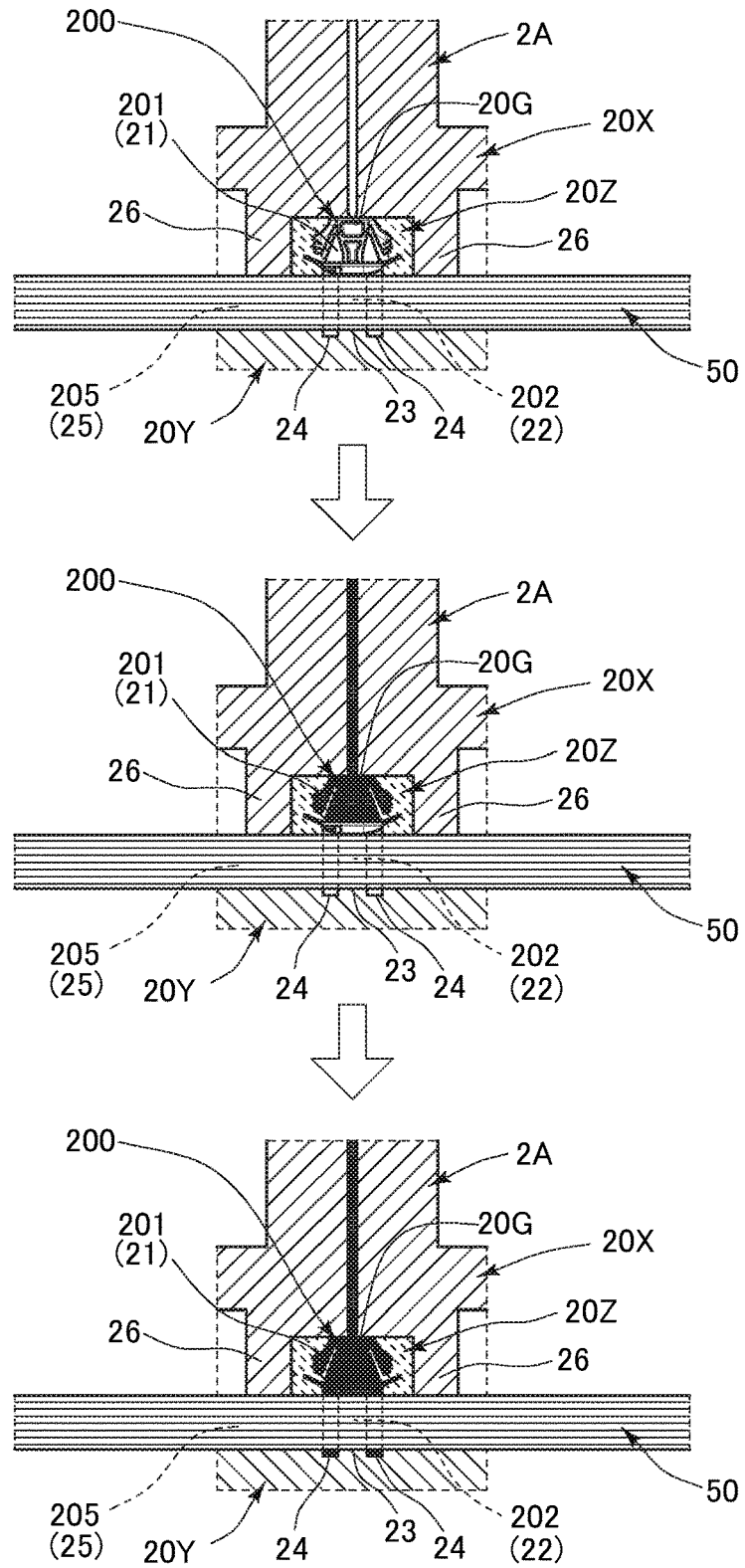
FIG. 13 shows, by using a cross sectional view obtained by cutting, in direction C, the metal mold in the mold-closed state in FIG. 5, a loading process of melt resin into the metal mold.

As shown in FIGS. 7 to 9, the metal mold 20 has a penetration hole-forming concavity 25 for forming a penetration hole 205 (also can be referred to as a wiring bundle disposition hole; see FIG. 13) through which the wiring bundle 50 is penetratingly disposed, and a retention portion-forming concavity 22 for forming, as the molding space 200, a retention portion-molding space 202 (see FIGS. 13 and 14) surrounding the outer circumference of the wiring bundle 50 penetratingly disposed at an intermediate section of the penetration hole 205. Furthermore, for the purpose of simultaneously molding the engagement portion 11 with the retention portion 12, the metal mold 20 has an engagement portion-forming concavity 21 that forms, as the molding space 200, an engagement portion-molding space 201 (see FIGS. 13 and 14) that is communicatively connected to the retention portion-molding space 202 on the outer circumference side thereof and that protrudes outward from the retention portion-molding space 202. The concavities 21, 22, and 25 respectively form the corresponding spaces 201, 202, and 205 (see FIGS. 13 and 14) in the mold-closed state of the metal mold 20. With this, the molding space 200 is formed within the metal mold 20 in a manner in which the retention portion-molding space 202 and the engagement portion-molding space 201 are communicatively connected.

Figure 10:
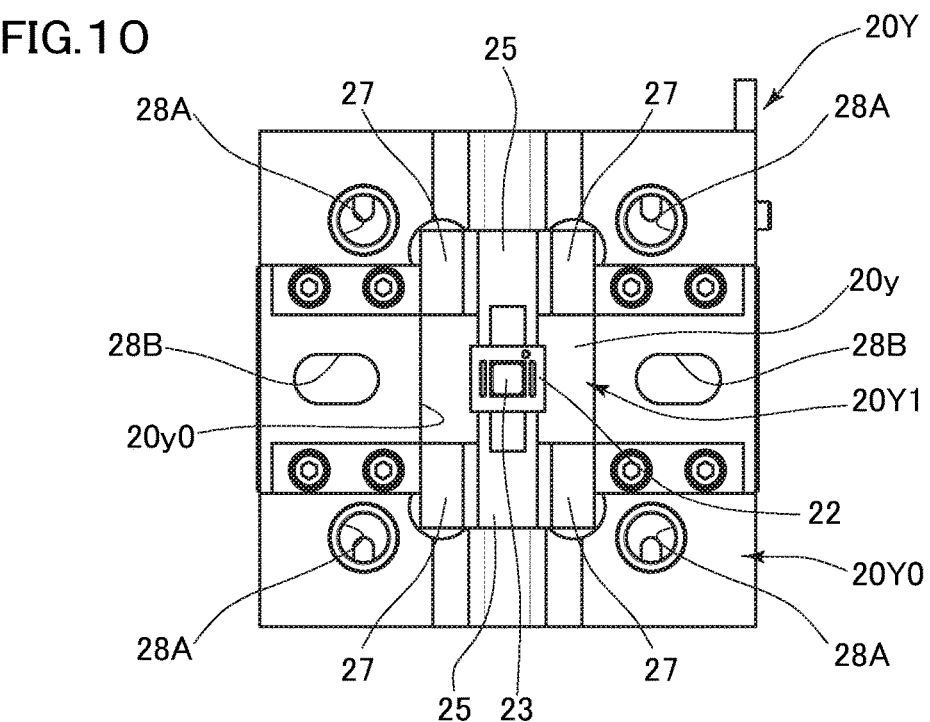
FIG. 10 shows the upper surface of the fixed mold in the manufacturing device in FIG. 4.

As shown in FIG. 10, the fixed mold 20Y, on a concavity 20y0 is formed on an upper surface 20y of a main body portion 20Y0, and a separate molded article-forming portion (an insert) 20Y1 is fitted in the concavity 20y0. On the molded article-forming portion 20Y1, the penetration hole-forming concavity 25 that forms the lower side of the penetration hole 205, the retention portion-forming concavity 22 that forms the lower side of the retention portion-molding space 202, and a pinching portion 27 are formed.

As shown in FIG. 9, in the first and second slide molds 20Z and 20W, molded article-forming portions 20Z1 and 20W1 having respective joining surfaces (contact surfaces: see FIGS. 11 and 12) 20z and 20w are fitted with respect to main body portions 20Z0 and 20W0. On the molded article-forming portions (i.e., inserts) 20Z1 and 20W1, the penetration hole-forming concavity 25 that forms the upper side of the penetration hole 205, the retention portion-forming concavity 22 that forms the upper side of the retention portion-molding space 202, and the engagement portion-forming concavity 21 that forms the lower side of the engagement portion-molding space 201, are formed.

As shown in FIG. 7, in the movable mold 20X, a concavity 20x0 is formed on a lower surface 20x of a main body portion 20X0, and a separate molded article-forming portion (i.e., an insert) 20X1 is fitted in the concavity 20x0. On the molded article-forming portion 20X1, the engagement portion-forming concavity 21 that forms the upper side of the engagement portion-molding space 201 is formed. Furthermore, a pressing portion 26 for pressing, from above with a pressure generated when the mold is closed, the wiring bundle 50 that is disposed in the penetration hole-forming concavity 25 of the fixed mold 20Y and is sandwiched by the pinching portion 27 is formed on the molded article-forming portion 20X1.

The molding space 200 is formed by the molded article-forming portions 20X1, 20Y1, 20Z1, and 20W1.

Figure 14:
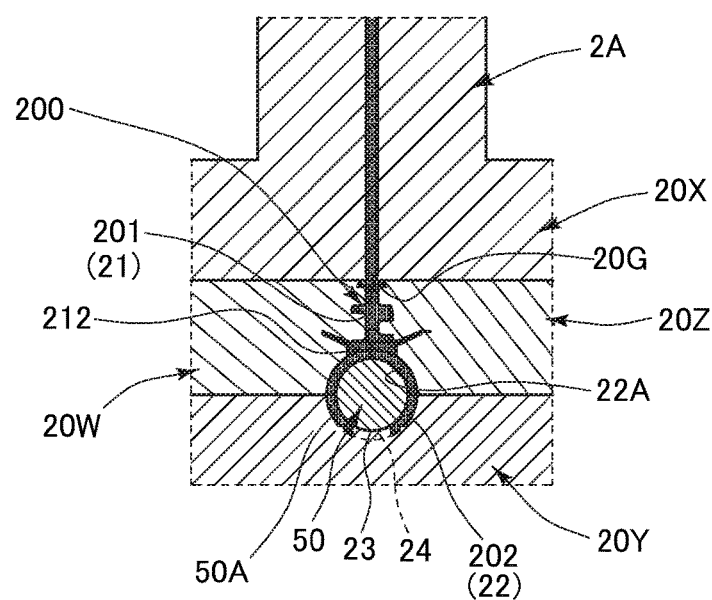
FIG. 14 shows, by using a cross sectional view obtained by cutting, in direction D, the metal mold in the mold-closed state in FIG. 5, a state in which the melt resin is loaded into the metal mold.

In addition, the metal mold 20 has, in the engagement portion-molding space 201, an inflow opening (i.e., a gate) 20G through which the melt resin is poured, as shown in FIGS. 13 and 14. Furthermore, the inflow opening 20G is provided to the engagement portion-molding space 201 at the most distal position from a communicatively connecting portion 212 (see FIG. 14) that becomes the boundary for the retention portion-molding space 202. More specifically, the inflow opening 20G is formed to the engagement portion-molding space 201 at a position of the leading end (also referred to as a front end) of the shaft portion 11A of the molded engagement portion 11.

Although the engagement portion-molding space 201 is a space for molding the engagement portion 11, the engagement portion-molding space 201 has a more complicated shape than the retention portion-molding space 202 and thereby is a portion with concerns regarding the melt resin not reaching the very tip thereof. Thus, since the melt resin is loaded in the engagement portion-molding space 201 at the beginning as a result of providing the inflow opening 20G at the engagement portion-molding space 201 as described above, the melt resin can be loaded to the very tip of the engagement portion-molding space 201 with certainty.

On the other hand, the metal mold 20 has a hole-forming portion 23 in the molding space 200 (201, 202). The hole-forming portion 23 forms, in the retention portion-molding space 202, a hole portion 12H (see FIG. 2) that is positioned so as to make contact with the outer circumferential surface 50A of the wiring bundle 50 penetratingly disposed in the penetration hole 205 and that penetrates the molded annular retention portion 12 in inward/outward direction (radial direction).

As shown in FIGS. 13 and 14, the hole-forming portion 23 is provided on the opposite side of the engagement portion-molding space 201 (also, the inflow opening 20G) in the retention portion-molding space 202. The hole-forming portion 23 is provided at a position that is exact opposite to the inflow opening 20G in the engagement portion-molding space 201. When the melt resin is poured in from the inflow opening 20G, the wiring bundle 50 is pushed toward the opposite side of the inflow opening 20G by the pressure of the melt resin. By having the hole-forming portion 23, since the wiring bundle 50 is retained at the center position (central portion) of the annular molding space 202 in a manner in which the wiring bundle 50 is placed on the hole-forming portion 23, the annular retention portion-molding space 202 is obtained and the retention portion 12 can be molded annularly with certainty. Thus, in this embodiment, the hole-forming portion 23 functions as a central position retention means of this invention.

On an inner circumferential wall surface 22A of the retention portion-forming concavity 22 that forms the retention portion-molding space 202 (in other words, the inner circumferential wall surface 22A, located at the outer circumference of the retention portion-molding space 202, of the metal mold 20: see FIG. 14); the hole-forming portion 23 is formed as a protruding portion that protrudes inward within the annular retention portion-molding space 202 from the inner circumferential wall surface 22A on the opposite side of the inflow opening 20G.

On the other hand, the retention portion-molding space 202 has groove portions 24 that extend out in the circumferential direction, and that form a pair on both-end sides of the hole-forming portion 23 in a penetration direction 205X of the penetration hole 205 (see FIG. 13) at a segment where the hole-forming portion 23 is located in the circumferential direction of the retention portion-molding space 202. By having the groove portions 24, the retention portion-molding space 202 forms an annularly continuous space that avoids the formation area of the hole-forming portion 23.

The hole-forming portion 23 and the groove portions 24 may also be formed on the inflow opening 20G side of the retention portion-molding space 202. In this case, the wiring bundle 50 penetratingly disposed in the penetration hole 205 is retained at the center position within the penetration hole 205 in a manner of being contacted by the hole-forming portions 23 located above and below (central position retention means).

As shown in FIGS. 8 and 9, the metal mold 20 has, on the fixed mold 20Y, the pinching portion 27 that sandwiches the wiring bundle 50 disposed in the penetration hole-forming concavity 25 (penetration hole 205). The pinching portion 27 functions as a temporary disposition portion configured to temporary dispose each of the wiring members 5 of the wiring bundle 50 disposed in the penetration hole-forming concavity 25 so as to be closely adhered to each other and not to be scattered, and also functions as a positioning portion configured to position the disposed wiring bundle 50 so as to pass through the center of the annular retention portion-molding space 202. The pinching portion 27 of this embodiment is located on both-end sides of the retention portion-molding space 202 in the penetration direction 205X of the penetration hole 205, and sandwiches, from both of those sides, and positions the wiring bundle 50. The pinching portion 27 is formed so as to oppositely protrude toward the movable mold 20X side (upward) from the upper surface 20y (see FIG. 10) of the fixed mold 20Y located below, and to sandwich the wiring bundle 50 disposed in the penetration hole 205.

When manufacturing the retention component 10 and the wire harness 1 in which the wiring bundle 50 is tied and retained by the retention component 10; first, by using the metal mold 20 and as shown in FIG. 9, on the fixed mold 20Y having the wiring bundle 50 penetratingly disposed in the penetration hole-forming concavity 25 that becomes the penetration hole 205, the slide molds 20W and 20Z are disposed (see FIG. 8), and additionally the movable mold 20X is disposed. Then, through the guide holes 28B, of the slide molds 20W and 20Z, penetratingly formed from inside above to outside below with respect to the slide molds 20W and 20Z; the guide pins 29B extending similarly from inside above to outside below of the movable mold 20X are inserted to bring closer the movable mold 20X and the fixed mold 20Y. With this, the slide molds 20W and 20Z approach each other while sliding on the fixed mold 20Y, and the metal mold 20 is closed as shown in FIG. 5.

Next, the melt resin is poured within the molding space 200 (201, 202) from the engagement portion-molding space 201 side by the resin supplying device 2A (see FIG. 13). Then, the poured melt resin is solidified through cooling. Then, the metal mold 20 is opened, and the wiring bundle 50 and the retention component 10 are taken out. With this, the retention component 10 having the engagement portion 11 and the retention portion 12 being closely adhered to the outer circumferential surface 50A of the wiring bundle 50 are obtained, and, furthermore, the wire harness 1 having the wiring bundle 50 and the retention component 10 is obtained. When opening the metal mold 20 by separating the movable mold 20X from the fixed mold 20Y, the slide molds 20W and 20Z are separated from each other while sliding on the fixed mold 20Y.

As described above, with this embodiment, since molding of the engagement portion 11 and the retention portion 12 and a tying operation of tying the wiring bundle 50 can be conducted simultaneously, the conventional tying operation performed by hands of a worker can be omitted, and working efficiency can be improved significantly.

Although the first embodiment of this invention has been described above, the embodiment is merely illustrative, this invention is not limited to the embodiment, and various modifications such as additions and omissions may be made based on the knowledge of a person skilled in the art without departing from the scope of the claims.

In the following, modifications and other embodiments different from the embodiment described above will be described. It should be noted that portions having the same functions as those in the above-described embodiment are designated by the same reference characters and the detailed description thereof is omitted. In addition, the above-described embodiment and the following examples may be combined to be implemented as appropriate as long as no technical contradiction arises.

In the embodiment described above, as long as the retention portion 12 of the retention component 10 is closely adhered to the outer circumferential surface 50A of the wiring bundle 50, the retention component 10 may be integrally fixed or not fixed in the closely adhered state with respect to the outer circumferential surface 50A of the wiring bundle 50.

Although the hole-forming portion 23 is formed as a protruding portion in the embodiment described above, instead of the protruding portion, the hole-forming portion 23 may be a molded article-forming portion (so-called an insert) that is separate from the retention portion-forming concavity 22 and that is detachably fitted with respect to the inner circumferential wall surface 22A of the retention portion-forming concavity 22. In this case, by forming a concavity for causing the molded article-forming portion to engage and be fitted on the inner circumferential wall surface 22A, the molded article-forming portion can be positioned and disposed.

In addition, as a method of not using the hole-forming portion 23, there is a method of setting the width of the retention portion-molding space 202 in an extending direction 205X of the wiring bundle 50 penetratingly disposed in the penetration hole 205, to be equal to or smaller than twice the diameter of a circular cross-section of one of the wiring members 5 forming the wiring bundle 50. With this, the annular retention portion-molding space 202 can be obtained with certainty since the width of the annular molding space 202 is small and the wiring members 5 cannot enter therein even when being bent. In addition, reducing the width of the annular molding space 202 results in a small width of the molded retention portion 12 and contributes to reducing the amount of the material.

In the following, modifications of this invention will be described.

In the case with the configuration of the embodiment described above, when the wiring bundle 50 disposed in the penetration hole 205 is subjected to a large pressure during, for example, pouring of the melt resin, the wiring bundle 50 may be pushed out from the central position of the annular retention portion-molding space 202 to possibly make contact with the inner circumferential wall surface 22A that forms the retention portion-molding space 202. In this case, the retention portion-molding space 202 cannot be obtained, and the annular retention portion 12 that was supposed to be molded becomes interrupted at the part where the contact is made and may be molded in a non-annular shape. At the retention portion 12 not molded annularly, there is a possibility of not being able to tie and retain the wiring bundle 50.

As a response, in this invention, a central position retention means, configured to retain the wiring bundle 50 disposed in the penetration hole 205 such that the wiring bundle 50 passes through the central portion of the annular retention portion-molding space 202, is provided to the metal mold 20.

Figure 15:
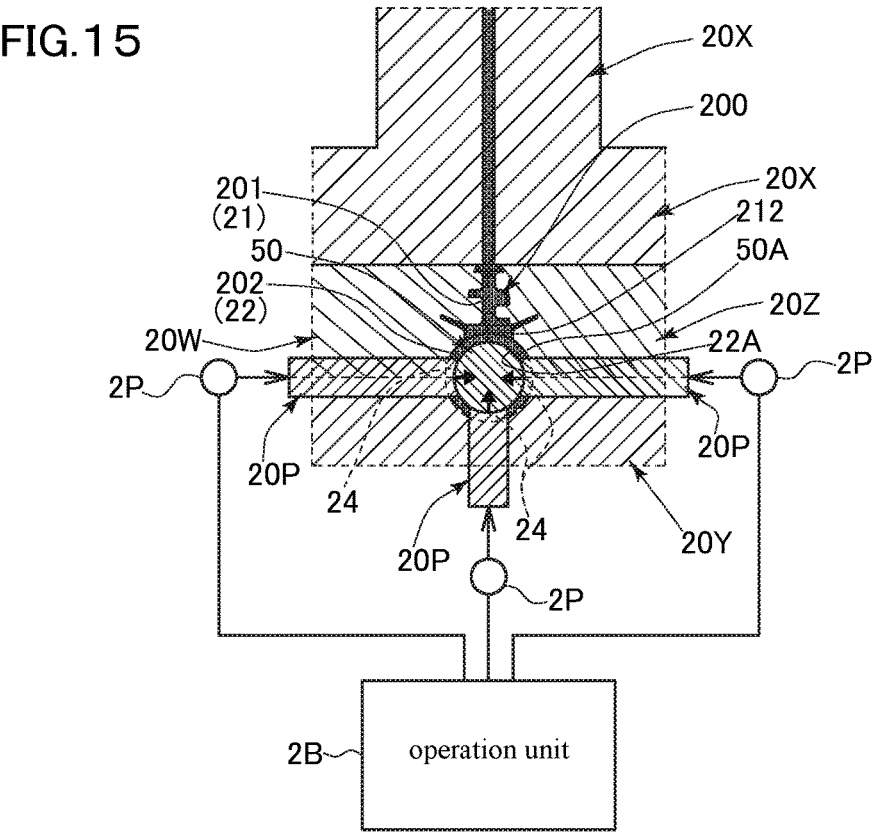
FIG. 15 is for describing a first example of a first modification of this invention by using the same cross section as in FIG. 14.

In a first modification of this invention, as shown in FIG. 15, employed as the central position retention means is a configuration including a first pressing means configured to press the outer circumferential surface 50A of the wiring bundle 50 disposed in the penetration hole 205 from multiple directions after at least the metal mold 20 is closed in the embodiment described above. The first pressing means of this modification is provided with pressing members 20P configured to press the outer circumferential surface 50A of the wiring bundle 50 disposed in the penetration hole 205, and a control unit (pressing control means) 2B configured to switch between a pressed state of retaining the pressing members 20P to cause the wiring bundle 50 to pass through the central portion of the annular retention portion-molding space 202 and a non-pressed state of not pressing. With this modification, since the wiring bundle 50 disposed within the penetration hole 205 can be positioned and retained at the central portion of the retention portion-molding space 202 by the pressing members 20P with certainty, the annular retention portion 12 can be molded with certainty.

A plurality of the pressing members 20P are provided around the outer circumference of the wiring bundle 50 disposed in the penetration hole 205, and can each move forward and backward to/from the wiring bundle 50. Among the pressing members 20P, there is one that is configured to press the wiring bundle 50 disposed in the penetration hole 205 from an immediate underneath position toward the center direction of the wiring bundle 50, and the control unit 2B actuates a pressing member-driving portion 2P (e.g., a motor) serving as a source for generating the pressing force to move the pressing members 20P forward and backward in up-down direction.

The source for generating the pressing force is not limited to an electromotive drive source as the pressing member-driving portion 2P (e.g., a motor or the like) as described above, and oil pressure, air pressure, an urging member (e.g., a spring or the like) may be used. When an urging member is used, the pressing force acts immediately in association with closing of the metal mold 20.

In addition, the pressing members 20P of this modification are disposed in a quantity of more than one. Thus, other than the one that is configured to press the wiring bundle 50 disposed in the penetration hole 205 from the immediate underneath position toward the center, the pressing members 20P of this modification also include those that press the wiring bundle 50 toward the center from other positions, and, when those are operated by the pressing member-driving portion (e.g., a motor) 2P driven and controlled by the control unit 2B, the wiring bundle 50 can be retained at the center.

Figure 16:
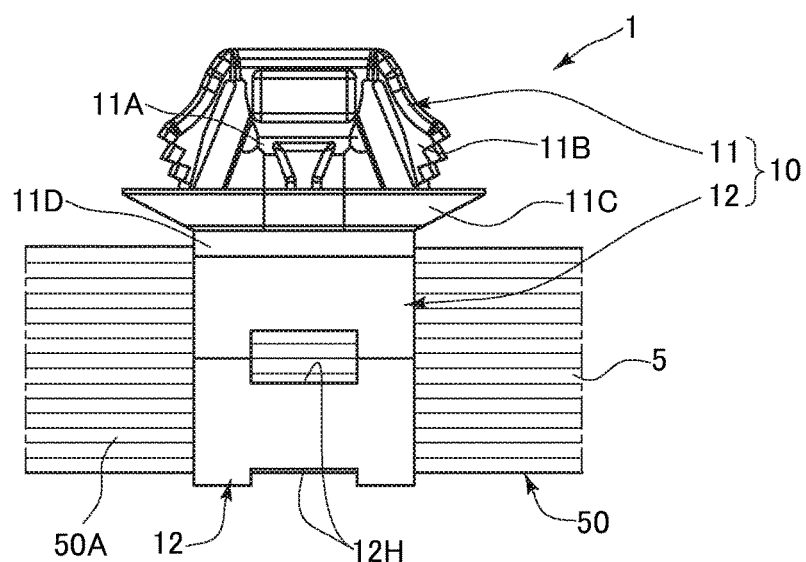
FIG. 16 is a front view of the wire harness molded by the metal mold in FIG. 15.

In this modification, since molding of the resin is conducted in a state where leading ends of the pressing members 20P are in contact with the wiring bundle 50, the leading ends function similarly to the hole-forming portion 23 in the embodiment described above, and, on the molded retention portion 12, the hole portion 12H penetrating inward/outward direction is formed by the pressing members 20P (see FIG. 16). Similarly to the embodiment described above, since the retention portion-molding space 202 of the metal mold 20 is connected in the circumferential direction at both-end sides of the leading ends of the pressing members 20P in the penetration direction 205X, the annular shape is obtained.

Figure 17:
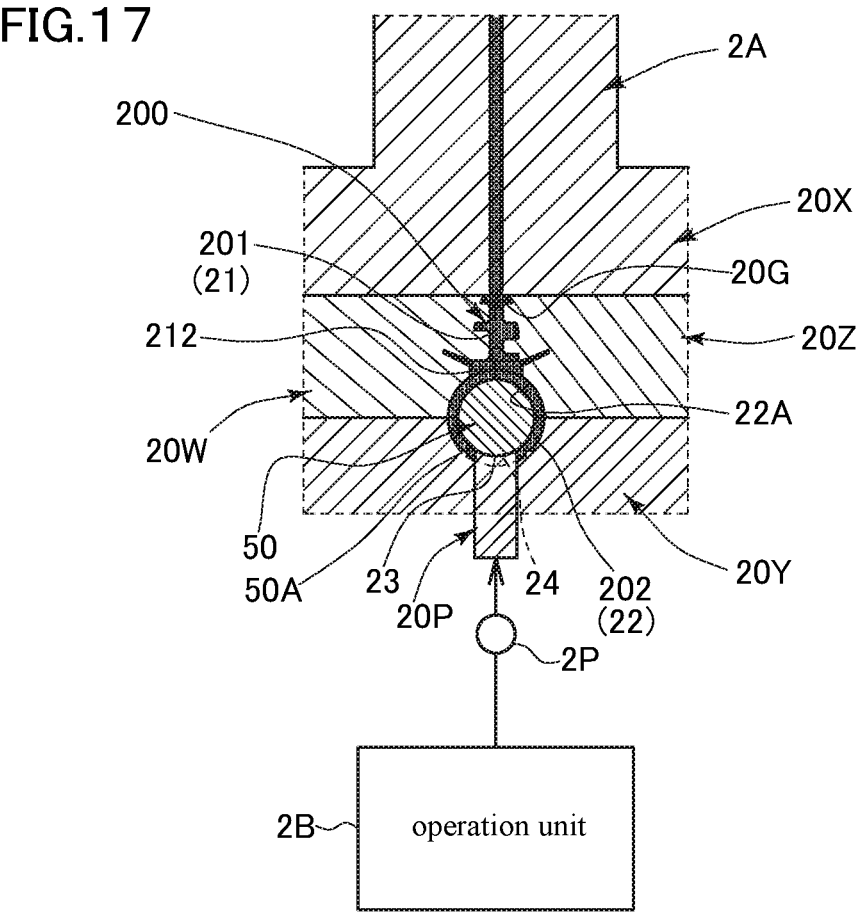
FIG. 17 is for describing a second example of the modification in FIG. 15 by using the same cross section as in FIG. 14.

Furthermore, as shown in FIG. 15, in the first modification, although a configuration is employed in which the pressing members 20P configured to press the outer circumferential surface 50A of the wiring bundle 50 from multiple directions are provided as the central position retention means (first pressing means); having at least a pressing member 20P configured to press the outer circumferential surface 50A of the wiring bundle 50 from an opposite side (here, from below) of the communicatively connecting portion 212 between the retention portion-molding space 202 and the engagement portion-molding space 201 is sufficient as shown in FIG. 17. Since pressure of the melt resin entering into the retention portion-molding space 202 from upper above can be countered from below by having the pressing member 20P configured to press from below, the wiring bundle 50 can be prevented from being bent and can be retained at the central position within the retention portion-molding space 202.

Figure 18:
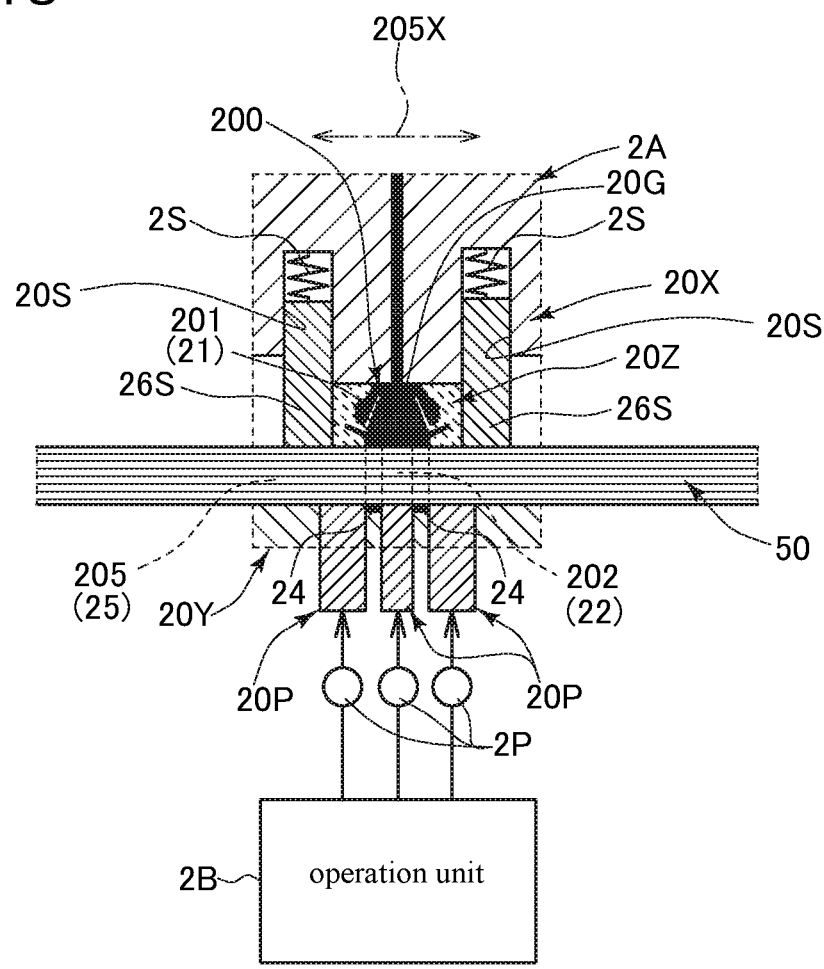
FIG. 18 is for describing a third example of the modification in FIG. 15 by using the same cross section as in FIG. 13.

Furthermore, as shown in FIG. 15, in the first modification, although a configuration is employed in which the pressing members 20P configured to press, in a form of an insert penetrating the retention portion-molding space 202, the outer circumferential surface 50A of the wiring bundle 50 are provided as the central position retention means (first pressing means); a pressing member 20P configured to press the outer circumferential surface 50A of the wiring bundle 50 in a form not penetrating the retention portion-molding space 202 may be added as shown in FIG. 18. Furthermore, a configuration obtained by modifying the first modification such that the pressing members 20P are configured to apply pressure in a form not penetrating the retention portion-molding space 202 may be used. In the case in FIG. 18, the pressing member 20P penetrating the retention portion-molding space 202, and the pressing members 20P and 20P located on both sides of the wiring bundle 50 in the long side direction, are included.

Figure 19:
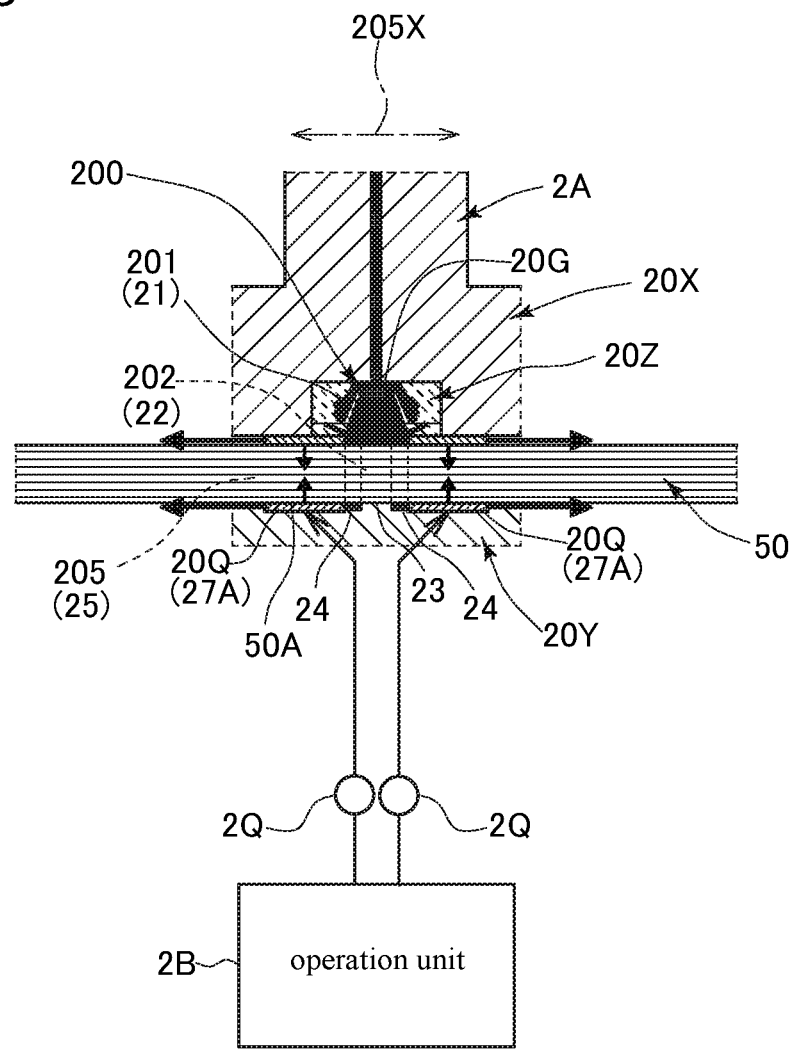
FIG. 19 is for describing a second modification of this invention by using the same cross section as in FIG. 13.

Furthermore, as shown in FIG. 19, in a second modification of this invention, a configuration is employed including, as the central position retention means, pulling means configured to pull the wiring bundle 50, from both-end sides in the length direction 205X thereof (in other words, penetration direction of the penetration hole 205), disposed in the penetration hole 205, after the metal mold 20 is closed in the embodiment described above. The pulling means of the second modification include pulling members 20Q configured to pull the wiring bundle 50 such that the wiring bundle 50 passes through the central portion of the annular retention portion-molding space 202, and a control unit (pull control means) 2B configured to switch between an unpulled state of not pulling and a pulled state of pulling and linearly retaining the wiring bundle 50 by the pulling members 20Q. Also in this modification, since the wiring bundle 50 disposed within the penetration hole 205 is positioned and retained at the central portion of the retention portion-molding space 202 by the pulling members 20Q, the annular retention portion 12 without any interruptions can be molded with certainty.

The pulling members 20Q include, for example, pinching portions 27A and 27A on both sides of the retention portion-forming concavity 22. The pinching portions 27A and 27A function as clamping portions configured to clamp and retain the wiring bundle 50. The control unit 2B actuates drive mechanisms 2Q including, for example, motors as drive sources to retain the wiring bundle 50 as being clamped by the pinching portions 27A and 27A, and can, in the clamped state, operate the pinching portions 27A and 27A so as to be separated from each other. The respective drive mechanisms 2Q transfer driving force (here, rotational output) of not-shown drive sources to the pinching portions 27A and 27A via gear mechanisms that are known in the art and are also not shown, and converts the driving force into separating motion force and clamping force of the pinching portions 27A and 27A.

It should be noted that the source for generating pulling force to separate the pinching portions 27A and 27A is not limited to the electromotive drive source as the motors described above, and oil pressure, air pressure, and the like may be used.

Furthermore, in this invention, a configuration may be employed including a biting prevention means configured to prevent biting of the wiring bundle 50 when closing the first slide mold (first opposing mold) 20Z and the second slide mold (second opposing mold) 20W. In the previously-described embodiments, at the time of closing the metal mold 20, the first and second slide molds 20Z and 20W approach each other so as to sandwich the wiring bundle 50 from a first side and a second side opposite thereof, and make contact with each other around the wiring bundle 50 to be closed. However, a problem arises at the time of contact, regarding the wiring bundle 50 being bitten by the first and second slide molds 20Z and 20W. By having the biting prevention means, biting that occurs at this time can be prevented.

In the first modification of this invention shown in FIG. 18, employed as the biting prevention means is a configuration including a second pressing means configured to press the outer circumferential surface 50A of the wiring bundle 50 from sides where the first and second opposing molds 20Z and 20W make contact. The second pressing means is a configuration provided with pressing members 26S configured to press the outer circumferential surface 50A of the wiring bundle 50 from the sides where the first and second slide molds 20Z and 20W make contact. According to this modification, since the wiring bundle 50 disposed within the penetration hole 205 is pressed by the pressing members 26S so as not to come close to where the first and second slide molds 20Z and 20W make contact, there is no concern of biting of the wiring bundle 50.

Although the pressing members 26S correspond to the pressing portion 26 (see FIG. 7) that protrudes downward from the movable mold 20X in the embodiment described above, the pressing members 26S of this embodiment are members separate from the movable mold 20X and are housed in a downward protruded state within pressing member-housing portions 20S having openings downward of the movable mold 20X. Urging members (here, springs) 2S are disposed on the rear side of the pressing members 26S opposite to the front end surfaces that press the wiring bundle 50. When the movable mold 20X approaches the fixed mold 20Y at the time of closing the metal mold 20, the pressing members 26S make contact with the outer circumferential surface 50A of the wiring bundle 50 from above, and are pushed within the pressing member-housing portions 20S while resisting urging force of the urging members 2S as the approach proceeds. When closing of the metal mold 20 is completed, the pressing members 26S are retained in a state where the center surfaces thereof are pressed against the outer circumferential surface 50A of the wiring bundle 50 by the urging force of the urging members 2S.

It should be noted that the source for generating the pressing force is not limited to the urging members 2S (springs), and electromotion, oil pressure, air pressure, and the like may be used.

In addition, the pressing of the wiring bundle 50 by the pressing members 26S as the biting prevention means is suffice when being conducted at least when closing the metal mold 20. However, in FIG. 18, since the source for generating the pressing force is the biasing means 2S (here, springs), the pressing continues until the metal mold 20 is opened. Thus, even when the melt resin is poured in after the metal mold 20 is closed, the wiring bundle 50 disposed in the penetration hole 205 is pressed downward.

Another modification of this invention is a configuration in which the metal mold 20 is provided with, on both-end sides sandwiching the retention portion-molding space 202 in the penetration hole 205, resin leakage suppression means configured to prevent or suppress leakage of the melt resin in a long side direction 205X of the wiring bundle 50 penetratingly disposed in the penetration hole 205.

Figure 20:
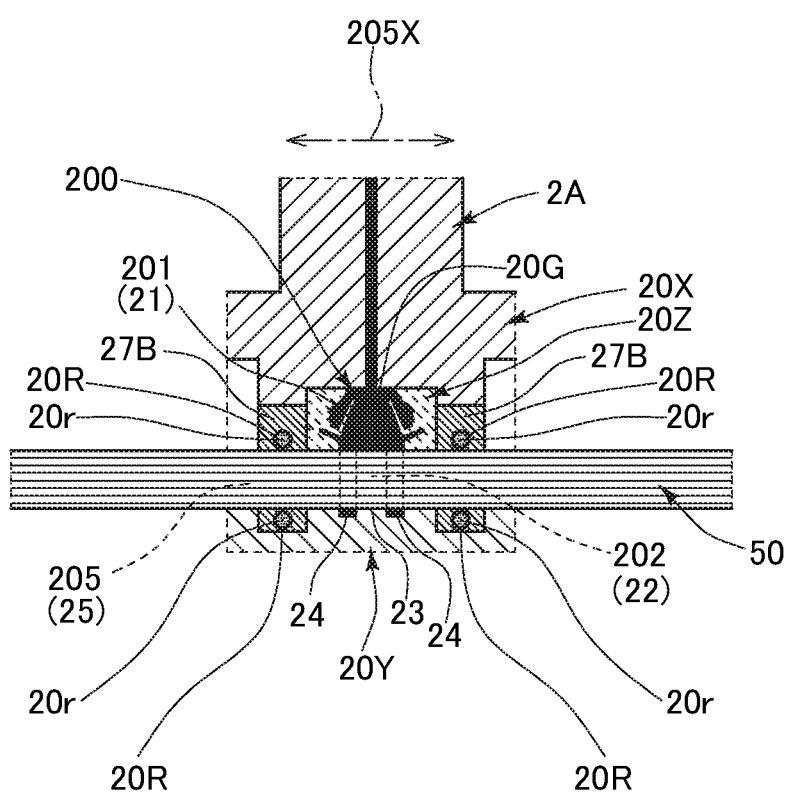
FIG. 20 is for describing a third modification of this invention by using the same cross section as in FIG. 13.

In this third modification, as shown in FIG. 20, a configuration is employed as the resin leakage suppression means, including cooling means configured to cool the both-end sides sandwiching the retention portion-molding space 202 (retention portion-forming concavity 22) in the penetration hole 205 (penetration hole-forming concavity 25) when the melt resin is supplied within the molding space 200 after the metal mold 20 is closed. Since the wiring bundle 50 is a bundle of the wiring members 5, the outer circumferential surface 50A of the wiring bundle 50 has multiple grooves in the long side direction. Thus, the melt resin that has spread throughout the retention portion-molding space 202 may spread in the long side direction (penetration direction 205X) of the wiring bundle 50 via the grooves, and may leak outside the retention portion-molding space 202. According to this modification, the melt resin that leaks outside the retention portion-molding space 202 can be solidified through cooling before leaking out. Furthermore, since a portion that leaks outside the retention portion-molding space 202 is the first to solidify through cooling, the portion solidified through cooling become a wall to prevent leakage of the melt resin that follows.

In this case, as the cooling means, for example, cooling inserts that function as cooling units disposed within the metal mold can be used. By cooling these inserts, leakage of the melt resin can be prevented. Specifically, pinching portions 27B and 27B configured to pinch sides on the outer circumference of the wiring bundle 50 disposed in the penetration hole 205 may be used as the cooling inserts from both sides of the retention portion-forming concavity 22, and a refrigerant 20r such as cooling water may be passed within refrigerant passages 20R formed inside the pinching portions 27B and 27B. In this case, by forming the pinching portions 27B and 27B with inserts made of a material having fine thermal conductivity such as beryllium copper, the cooling effect can be increased. In addition, supply of the refrigerant 20r within the refrigerant passages 20R may be controlled by the control unit 2B. It should be noted that, a material having fine thermal conductivity here refers to a material having a thermal conductivity of stainless steel or better, and is furthermore preferably a material having a thermal conductivity of 25.5 W/m·° C.

In this invention, as the resin leakage suppression means, a configuration can be employed in which an elastic member such as rubber or the like that annularly surrounds the wiring bundle 50 can be disposed so as to be adjacent to both sides of the retention portion-molding space 202 in the penetration direction 205X. When this elastic member is disposed so as to surround and press the outer circumferential surface 50A of the wiring bundle 50 penetratingly disposed in the penetration hole 205, the elastic member having elasticity adheres closely to, and fills the gaps of the rugged outer circumferential surface 50A of the wiring bundle 50. As a result, side leakage (more specifically, leakage in the penetration direction 205X) of the melt resin loaded in the retention portion-molding space 202 can be prevented, and formation of an excess-thickness portion by the resin leaked from the side can be suppressed.

Furthermore, in this invention, it is possible to employ, as the resin leakage suppression means, a configuration including a third pressing means configured to press the outer circumferential surface 50A of the wiring bundle 50 disposed in the penetration hole 205 from the opposite side of the communicatively connecting portion 212 between the retention portion-molding space 202 and the engagement portion-molding space 201, after at least the metal mold 20 is closed. One conceivable cause of side leakage (leakage in the penetration direction 205X) of the resin is a situation in which the upper side of the wiring bundle 50 is pushed downward by the pressure of the melt resin to cause a gap on the upper side, resulting in side leakage occurring through the gap. Thus, when the wiring bundle 50 disposed in the penetration hole 205 is pressed toward the communicatively connecting portion 212 from the opposite side of the communicatively connecting portion 212 between the retention portion-molding space 202 and the engagement portion-molding space 201; formation of such a gap can be prevented and side leakage of the resin can be prevented.

It should be noted that the third pressing means can be used as the previously-described first pressing means shown in FIGS. 15, 17, and 18. More specifically, the configuration of pressing the outer circumferential surface 50A of the wiring bundle 50 upward from below by the pressing members 20P can be also utilized as the resin leakage suppression means.

It should be noted that, in the previously-described modification in FIG. 18, the pressing members 26S forming the second pressing means press the wiring bundle 50 disposed in the penetration hole-forming concavity 25 of the fixed mold 20Y forming the lower side of the penetration hole 205, downward from above on both sides sandwiching the first and second slide molds 20Z and 20W that are closed. Since the pressing members 26S press the wiring bundle 50 downward also when the melt resin is poured in after the metal mold is closed, even if the melt resin leaks out from the first and second slide molds 20Z and 20W in the long side direction 205X of the wiring bundle 50, the pressing members 26S can prevent further spillage of the resin outside. Thus, the pressing members 26S forming the second pressing means can also function as the resin leakage suppression means.

Figure 21:
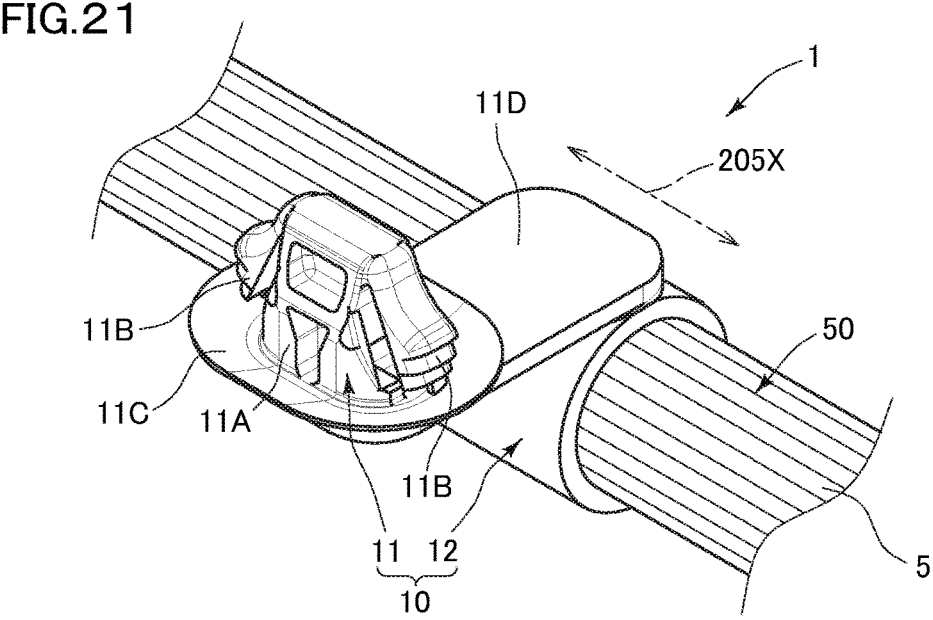
FIG. 21 is a perspective view of a modification of the wire harness from the first direction in FIG. 1.
Figure 22:
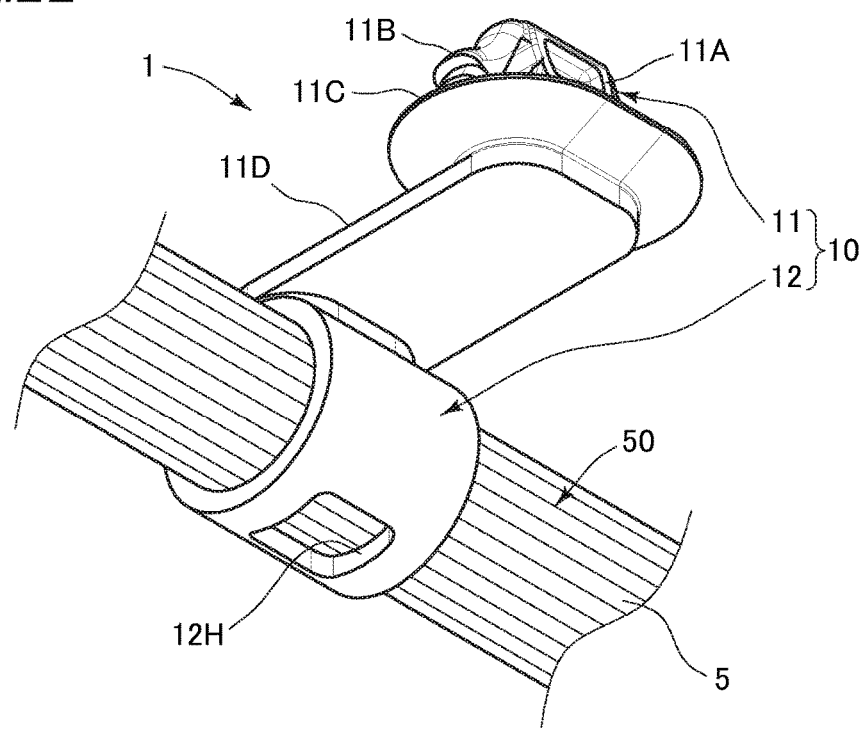
FIG. 22 is a perspective view of a modification of the wire harness from the second direction in FIG. 1.

In a fourth modification of this invention, for the purpose of disposing the engagement portion 11 at a position further away from the retention portion 12 in the retention component 10 and the wire harness 1; the connecting portion 11D is formed as an extension portion that extends outward in a direction of a tangent of the annular retention portion 12 as shown in FIGS. 21 and 22. In the case in FIG. 21, the connecting portion 11D of the engagement portion 11 extends out from a side of outer circumference of the annular retention portion 12 in a direction of the tangent thereof; whereas the shaft portion 11A of the engagement portion 11 has an axis line extending in a direction that is orthogonal to both an extending direction where the connecting portion 11D extends and the long side direction (in other words, the penetration direction 205X) of the wiring bundle 50, and extends out in a direction away from the retention portion 12. By forming the connecting portion 11D in this manner, not only the engagement portion 11 can be formed to extend directly outward from the retention portion 12, but also the engagement attachment portions enabling engagement and attachment on the vehicle body 100 side such as the elastic portion 11B and the contact portion 11C can be formed at a position away from the retention portion 12. With this, the wire harness 1 and the retention component 10 can be attached to the predetermined attachment hole 100H of the vehicle body 100 at a position away from the retention portion 12.

Figure 23:
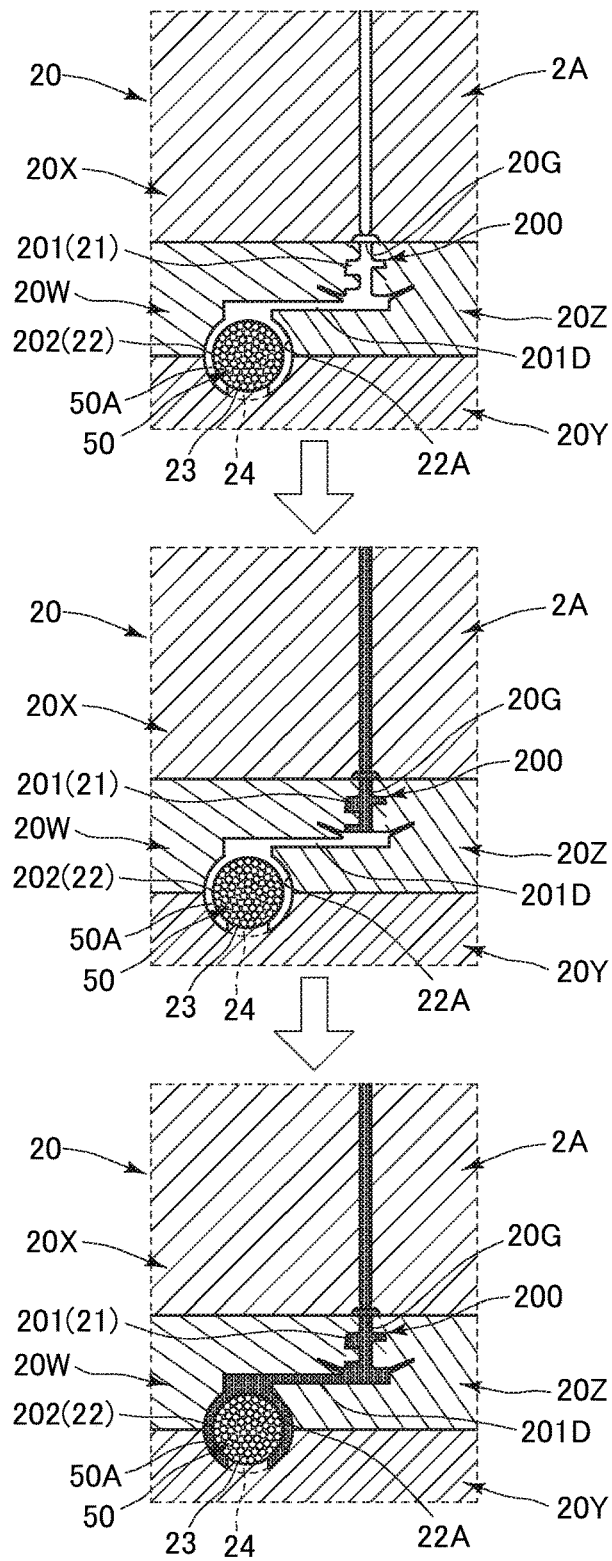
FIG. 23 shows, by using the same cross section as in FIG. 14, the process in which the melt resin is loaded inside the metal mold in the mold-closed state for manufacturing the wire harness in FIG. 21.

The wire harness 1 and the retention component 10 having the connecting portion 11D as shown in FIGS. 21 and 22 can be manufactured by using the metal mold 20 as shown in FIG. 23.

The metal mold 20 in FIG. 23 has the movable mold 20X, the fixed mold 20Y, the first slide mold 20Z, and the second slide mold 20W; and, when those are positioned and combined, the metal mold 20 is closed and forms the molding space 200 therein. The difference from previously-described other embodiments is having, in the engagement portion-molding space 201 which is one part of the molding space 200, a connecting portion-molding space 201D in which the connecting portion 11D for positioning the retention portion 12 away from the shaft portion 11A, the elastic portion 11B, and the contact portion 11C of the engagement portion 11 is molded as described above. The position of the inflow opening (so-called gate) 20G through which the melt resin is poured is similar to that in the previously-described embodiments. Features such as including the hole-forming portion 23 and the groove portions 24 in the retention portion-molding space 202 are similar to the previously-described embodiments. With the metal mold 20, the melt resin entering the molding space from the inflow opening (gate) 20G first enters the engagement portion-molding space 201, and then passes through the connecting portion-molding space 201D and enters the retention portion-molding space 202. Then, by parting the metal mold after the melt resin solidifies through cooling, the wire harness 1 and the retention component 10 as shown in FIGS. 21 and 22 can be obtained. Similarly to other embodiments, the retention portion 12 of the retention component 10 has the hole portion 12H that penetrates in inward/outward direction.

DESCRIPTION OF THE REFERENCE CHARACTERS 1 wire harness
10 retention component
11 engagement portion
12 retention portion
2 molding machine
2A supplying device (resin supply means)
2B control unit
20 metal mold
20X movable mold
20Y fixed mold
20W, 20Z slide mold
20G inflow opening (gate)
200 molding space
201 engagement portion-molding space
202 retention portion-molding space
205 penetration hole
205X penetration direction
21 engagement portion-forming concavity
22 retention portion-forming concavity
23 hole-forming portion
5 wiring member
50 wiring bundle
50A outer circumferential surface of wiring bundle

What is claimed is:

1. A method for manufacturing a wire harness including an engagement portion to be attached to a vehicle body, a wiring bundle, and a retention portion configured to retain the wiring bundle,
   with usage of a metal mold having a penetration hole in which the wiring bundle is penetratingly disposed, an annular retention portion-molding space that surrounds, at an intermediate section of the penetration hole, an outer circumference of the disposed wiring bundle, and an engagement portion-molding space that is communicatively connected with the retention portion-molding space and that has an inflow opening for a melt resin,
   the method comprising: pouring the melt resin from the inflow opening in a state where the wiring bundle is penetratingly disposed in the penetration hole of the metal mold to load the melt resin from the engagement portion-molding space for forming the engagement portion to the retention portion-molding space for forming the retention portion; and solidifying the resin through cooling to mold the retention portion, formed integrally with the engagement portion, in a tied state of being closely adhered to a rugged outer circumferential surface of the wiring bundle.

2. The method for manufacturing the wire harness according to claim 1, wherein
   the engagement portion-molding space is a space that is communicatively connected to the annular retention portion-molding space on an outer circumference side thereof and that protrudes outward, and has the inflow opening at a position farthest from where the engagement portion-molding space is communicatively connected with the retention portion-molding space.

3. The method for manufacturing the wire harness according to claim 1, wherein the metal mold is provided with a central position retention means configured to retain the wiring bundle disposed in the penetration hole such that the wiring bundle passes through a central portion of the annular retention portion-molding space.

4. The method for manufacturing the wire harness according to claim 3, wherein
   a hole-forming portion positioned so as to make contact with the outer circumferential surface of the wiring bundle penetratingly disposed in the penetration hole, and configured to form a hole portion that penetrates the molded annular retention portion in inward/outward direction, is included as the central position retention means.

5. The method for manufacturing the wire harness according to claim 3, wherein
   a first pressing means configured to provide a push with respect to, after the metal mold is closed but before the melt resin is poured, the outer circumferential surface of the wiring bundle disposed in the penetration hole, is included as the central position retention means, and the wiring bundle is retained so as to pass through the central portion of the retention portion-molding space by the push.

6. The method for manufacturing the wire harness according to claim 5, wherein the first pressing means is configured to, when pouring the melt resin, press the outer circumferential surface of the wiring bundle disposed in the penetration hole from an opposite side of a communicatively connecting portion between the retention portion-molding space and the engagement portion-molding space.

7. The method for manufacturing the wire harness according to claim 3, wherein
a pulling means configured to provide a pull with respect to the wiring bundle penetratingly disposed in the penetration hole from both-end sides in length direction of the wiring bundle, is included as the central position retention means, and,
by the pull, the wiring bundle is linearly retained so as to pass through the central portion of the retention portion-molding space.

8. The method for manufacturing the wire harness according to claim 1,
the metal mold including first and second opposing molds configured to, when the metal mold is to be closed, to approach each other so as to sandwich the wiring bundle from a first side and a second side opposite thereof and make contact with each other around the wiring bundle to be closed, and
the method for manufacturing the wire harness comprising a biting prevention means configured to prevent biting of the wiring bundle when closing the first and second opposing molds.

9. The method for manufacturing the wire harness according to claim 8, wherein the biting prevention means is a second pressing means configured to press the outer circumferential surface of the wiring bundle from sides where the first and second opposing molds make contact.

10. The method for manufacturing the wire harness according to claim 1, wherein the metal mold includes, on both-end sides sandwiching the retention portion-molding space in the penetration hole, resin leakage suppression means configured to prevent or suppress leakage of the melt resin in a long side direction of the wiring bundle penetratingly disposed in the penetration hole.

11. The method for manufacturing the wire harness according to claim 10, wherein cooling means configured to cool the both-end sides sandwiching the retention portion-molding space in the penetration hole are included as the resin leakage suppression means.

12. The method for manufacturing the wire harness according to claim 10, wherein an elastic member disposed, at the both-end sides sandwiching the retention portion-molding space in the penetration hole, so as to surround the outer circumference of the wiring bundle penetratingly disposed in the penetration hole, and configured to fill gaps on the rugged outer circumferential surface of the wiring bundle, is included as the resin leakage suppression means.

13. The method for manufacturing the wire harness according to claim 10, wherein a third pressing means configured to press, when the melt resin is poured, the outer circumferential surface of the wiring bundle disposed in the penetration hole from the opposite side of the communicatively connecting portion between the retention portion-molding space and the engagement portion-molding space, is included as the resin leakage suppression means.

* * * * *